Patented July 5, 1949

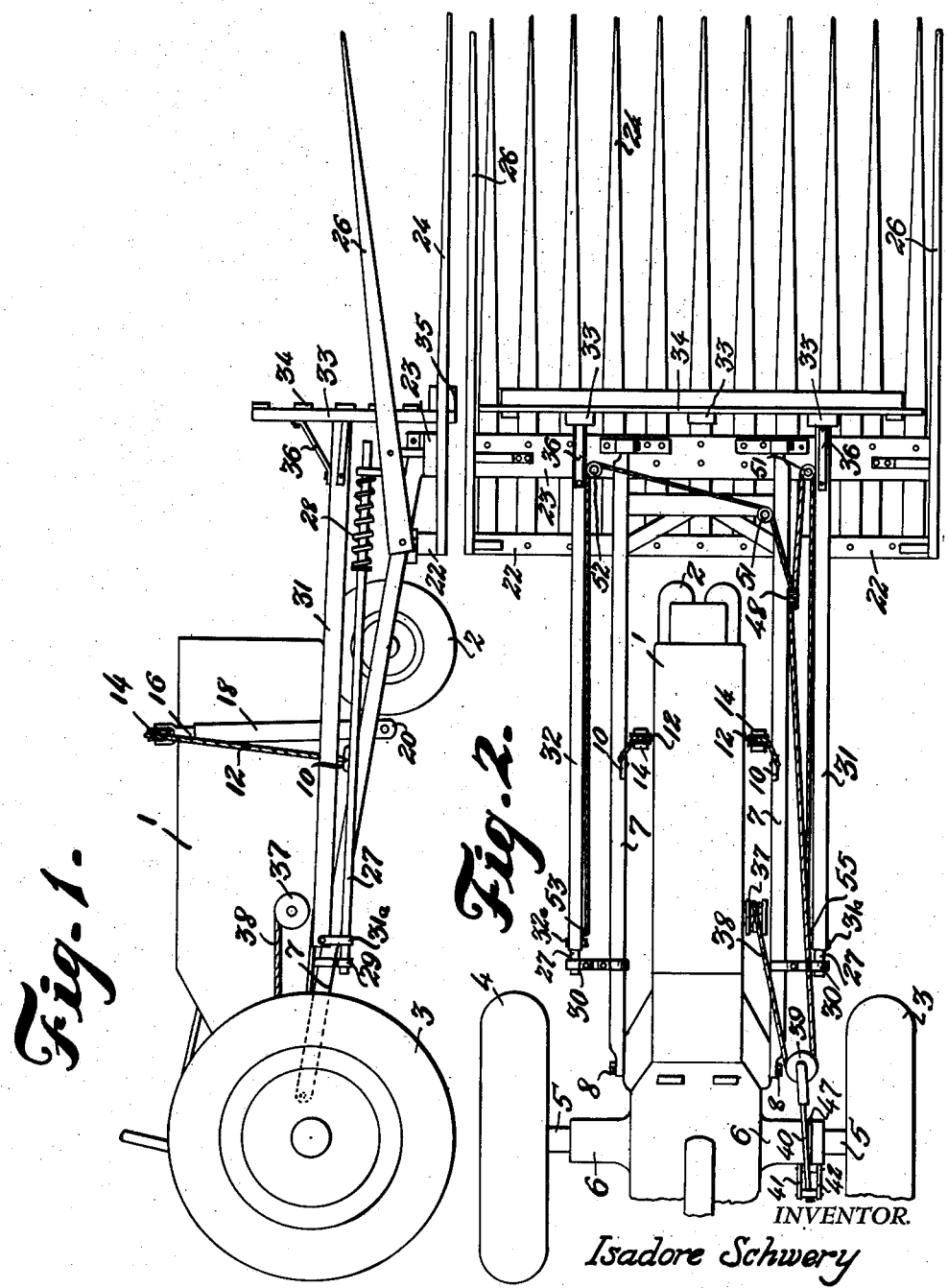

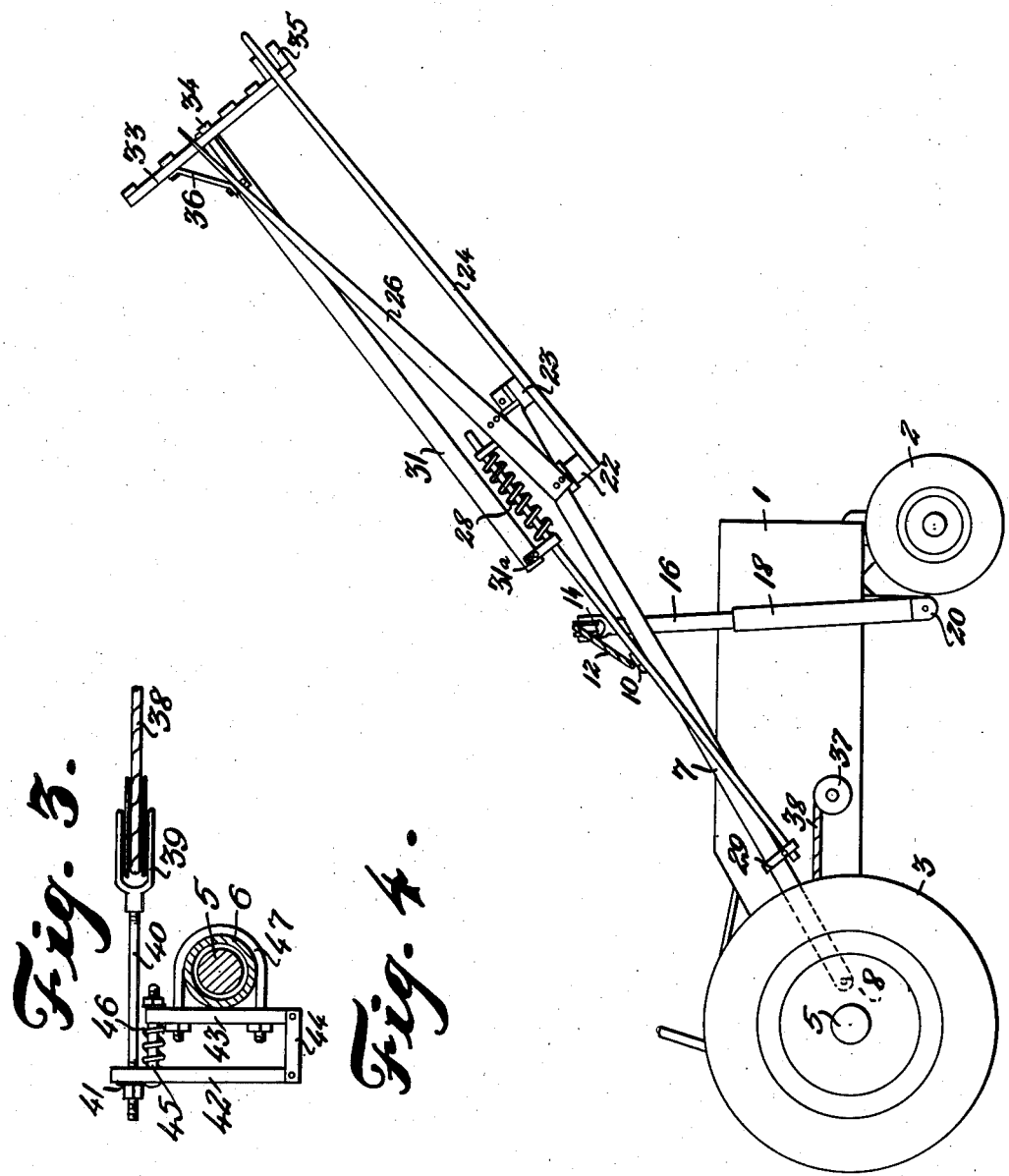

2,475,203

UNITED STATES PATENT OFFICE 2,475,203

HAY LIFT AND SWEEP

Isadore Schwery, Panama, Iowa

Application May 29, 1946, Serial No. 673,194

2 Claims. (Cl. 214—131)

My present invention relates to an improved hay lift and sweep and the type employed with farm tractors and wherein the various parts form a unique and practical combination to perform the desired function with facility.

In the accompanying drawings I have illustrated one complete example of the physical embodiment of my invention according to the best mode I have thus far devised but it will be understood that various changes and alterations may be made in the exemplified structure within the scope of the appended claims.

In the drawings:

Figure 1 is a side elevational view of the tractor showing the hay lift and sweep of my invention.

Figure 2 is a top plan view thereof.

Figure 3 is an enlarged detail view of the sheave resiliently mounted upon the rear axle housing; and Figure 4 is a side elevational view showing the lift and sweep in extended position.

Referring now to the drawings in detail wherein like characters indicate like parts, I have shown a tractor 1 of conventional construction and appearance having front wheel 2 and rear wheels 3 and 4. The rear axle is shown at 5 and the housing for the rear axle at 6.

Extending forward on the tractor I have illustrated the side bars 7 which may be of tubular or solid construction and bolted to the frame of the tractor as at 8. Brackets 10 on the side rods 8 having openings therein to receive the ropes 12 which pass over and are attached to the sheaves or pulleys 14. These pulleys are attached or affixed to the piston rods 16 of the hydraulic cylinders 18 secured to the tractor as at 20. Pressure for these cylinders is provided by the tractor in conventional manner.

The hay lift of my invention is fashioned with cross bars 22 and 23 and under the said cross bars are affixed the forwardly extending tines 24. Side bars 26 prevent the forked hay from falling off the sides of the lift.

Guide rods 27 for the sweep are secured to the side bars 7 by brackets 30 and on the free ends of the guide rods I employ a coil spring 28. Push rods for the sweep are shown as at 31 and 32 having brackets 31a and 32a engaging the guide rods rearward of the spring 28 and the gate or sweep comprises the vertical posts 33 and the horizontal bars 34 secured by angle braces 36 to the push rods 31 and 32. A retaining bar 35 is located for travel under the tines to maintain the sweep in contact therewith.

The push rods 31 and 32 are therefore designed to reciprocate upon the guide rods 27 and the extended limit of the push rods is resiliently set by the coil spring 28.

A reel 37 operably connected with and mounted on the tractor carries a rope 38 which passes through the sheave or pulley 39 and this pulley is affixed to a rod 40 secured at 41 on leg 42 of a U-frame, the other leg 43 being connected with the leg 41 by means of the pivotally connected cross bar 44. A bolt 45 carrying coil spring 46 connects the upper free ends of the legs 42 and 43 and the leg 43 is secured to the axle housing 6 by means of the U-bolt 47.

After the rope 38 passes through the pulley 39 it reverses its direction and is spliced as at 48. The sections 49 and 50 from the splice separate to provide lifting means for both sides of the sweep frame. Rope 49 passes through pulleys 51 and 52 to the eye 53 on push rod 32 while the rope section 50 passes through pulley 54 to eye 55 on the push rod 31.

In operation the tractor is driven forward into a hay pile with the tines lowered and the sweep retracted. As the hay is pushed onto the tine and a load is ready, the lift is elevated by operation of the hydraulic cylinders. If the hay is to be deposited in an adjacent stack, then the reel 37 is operated to draw in the rope 38 and the sections 49 and 50 to push forward the push rods and the sweep. The forward movement of the sweep clears the hay from the tines and the lift and sweep is ready for another load by simply reversing the reel direction and reducing the pressure in the hydraulic cylinders.

The device of my invention is simple in construction and operation and is durable. The device will perform the work of many men and will save many hours of labor.

The lift and sweep may be removed as occasion warrants the manure loaders, or other devices substituted.

Having thus fully described my invention what I claim as new and desire to secure by Letters Patent is:

1. A hay lift and sweep comprising a tractor having a rear axle housing, side bars pivotally connected to the tractor near the rear thereof and extending forwardly to the front of the tractor, cross bars connected to the forward ends of the side bars, tines extending forwardly from the cross bars, a sweep mounted on the tines for adjustment thereover and adapted to discharge a load of hay therefrom, push rods extending rearwardly from the sides of the sweep, guide rods connected to the side bars near the rear and forward ends thereof, means for slidably connecting the push rods to the guide rods whereby the push rods will be controlled during the forward movement of the sweep, means connected between the tractor and the side bars for elevating the same, and means extending between the push rods and the tractor for causing their forward movement and said guide rods being connected at their rear ends to the side bars to depend downwardly and at their forward ends to the side bars to extend upwardly therefrom, and cushioning means on the forward ends of the side bars to cushion the final part of the movement of the sweep and limit its outward movement.

2. A hay lift and sweep comprising a tractor having a rear axle housing, side bars pivotally connected to the tractor near the rear thereof and extending forwardly to the front of the tractor, cross bars connected to the forward ends of the side bars, tines extending forwardly from the cross bars, a sweep mounted on the tines for adjustment thereover and adapted to discharge a load of hay therefrom, push rods extending rearwardly from the sides of the sweep, guide rods connected to the side bars near the rear and forward ends thereof, means for slidably connecting the push rods to the guide rods whereby the push rods will be controlled during the forward movement of the sweep, means connected between the tractor and the side bars for elevating the same, and means extending between the push rods and the tractor for causing their forward movement and said means for advancing the sweep including a reel on the tractor, a rope extending therefrom, a pulley and means for connecting the pulley to the tractor, including a U-frame adapted to be connected to the rear of a rear axle housing of the tractor and having a rod connecting with the pulley and extending through one leg of the U-frame, a bolt extending between the upper ends of the U-frame and a compression spring on the bolt to limit the movement of the one leg to the other leg of the U-frame, a cable extending over the reel and the pulley and having divided forward sections connected respectively with the forward portions of the side bars and extending rearwardly and connected to the rear ends of the push rods.

ISADORE SCHWERY.

REFERENCES CITED

The following references are of record in the file of this patent:

UNITED STATES PATENTS

| Number | Name | Date |
|---|---|---|
| 890,061 | Jarboe | June 9, 1908 |
| 2,246,083 | Weber | June 17, 1941 |
| 2,295,917 | Schwan | Sept. 15, 1942 |
| 2,306,474 | Tieslau | Dec. 29, 1942 |
| 2,311,523 | Cope et al. | Feb. 16, 1943 |
| 2,391,224 | Carter | Dec. 18, 1945 |
| 2,404,154 | Williams | July 16, 1946 |